United States Patent
Blanco et al.

(10) Patent No.: US 7,034,834 B2
(45) Date of Patent: Apr. 25, 2006

(54) COMMUNICATION PROTOCOL FOR SYNCHRONIZING ANIMATION SYSTEMS

(75) Inventors: Leonardo Blanco, Redmond, WA (US); Andrei Baioura, Bellevue, WA (US); Matt Calkins, Seattle, WA (US); Paul David, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 10/692,673

(22) Filed: Oct. 24, 2003

(65) Prior Publication Data

US 2005/0088443 A1  Apr. 28, 2005

(51) Int. Cl.
*G06T 15/00* (2006.01)
(52) U.S. Cl. ............... 345/473; 345/501; 715/781
(58) Field of Classification Search ........ 345/473–475, 345/531–535, 501–505; 715/781–782, 793–794
See application file for complete search history.

(56) References Cited

U.S. PATENT DOCUMENTS

| | | | |
|---|---|---|---|
| 5,852,449 A * | 12/1998 | Esslinger et al. | 345/473 |
| 6,563,503 B1 * | 5/2003 | Comair et al. | 345/473 |
| 6,919,900 B1 * | 7/2005 | Wilt | 345/535 |
| 6,924,807 B1 * | 8/2005 | Ebihara et al. | 345/503 |

* cited by examiner

*Primary Examiner*—Phu K. Nguyen
(74) *Attorney, Agent, or Firm*—Lee & Hayes PLLC

(57) ABSTRACT

A communications protocol is described that governs asynchronous exchange of data between a high level animation system and a low level animation system. The high level animation system has a variable, medium-frequency frame rate and is optimized for interactivity. The low level animation system has a constant, high frequency frame rate and is optimized for high refresh frame rate. The communications protocol includes messages that can be sent by the high-level animation system to the low-level animation system to designate an animation and how the animation is to change over a specified period of time. As a result, the low-level system can display the animation at the high refresh rate even if animation data is not received from the high-level system for every frame.

19 Claims, 7 Drawing Sheets

| HIGH LEVEL TIMING ENGINE TO LOW LEVEL TIMING ENGINE ||
|---|---|
| MESSAGE | PARAMETERS |
| CREATE CLOCK | INITIAL CLOCK PROPERTIES |
| UPDATE PROPERTIES | TARGET CLOCK; UPDATED PROP'S |
| ADD INTERVAL | TARGET CLOCK; INTERVAL PROP'S |
| RESET SYNCHRONIZATION SLIP | TARGET CLOCK |
| REMOVE ALL INTERVALS | TARGET CLOCK |
| DELETE CLOCK | CLOCK TO DELETE |

*Fig. 4a*

| LOW LEVEL TIMING ENGINE TO HIGH LEVEL TIMING ENGINE ||
|---|---|
| MESSAGE | PARAMETERS |
| SYNCHRONIZE WITH MEDIA SLIP | TARGET CLOCK; SLIP AMOUNT |

*Fig. 4b*

| HIGH LEVEL ANIMATION OBJECTS TO LOW LEVEL ANIMATION OBJECTS ||
|---|---|
| MESSAGE | PARAMETERS |
| CREATE ANIMATION | OUTPUT VALUE TYPE, ANIMATION FUNCTION & CONTROLLING CLOCK |
| UPDATE ANIMATION | TARGET ANIMATION; UPDATED PROP'S |
| CREATE ANIMATION COLLECTION | INITIAL LIST OF ANIMATIONS |
| ADD ANIMATION TO COLLECTION | TARGET ANIMATION COLLECTION & ANIMATION TO ADD |
| REMOVE ANIMATION FROM COLLECTION | TARGET ANIMATION COLLECTION & ANIMATION TO REMOVE |
| CREATE STATIC VALUE | VALUE TYPE; INITIAL VALUE |
| UPDATE STATIC VALUE | TARGET STATIC VAL OBJ.; NEW VAL |

*Fig. 4c*

COMMUNICATION PROTOCOL FOR SYNCHRONIZING ANIMATION SYSTEMS

TECHNICAL FIELD

The systems and methods described herein relate generally to animation systems and, more specifically, to a communication protocol for maintaining data and clock synchronization between multiple animation systems.

BACKGROUND

Whether related to video games, network web sites, multimedia presentations or the like, user expectations with regard to graphics quality has significantly increased in recent years. Consequently, this high level of expectations poses ever-increasing challenges to video/animation system and application developers.

Interactive animation applications present a special consideration because two animation systems (e.g., an application stored in local or remote memory and a display device system) must communication with each other to provide a quality user experience. A problem exists here because one animation system (i.e. the application stored in memory) is mostly concerned with user interactivity while the other animation system (i.e. the display device system) is primarily concerned with rendering aspects such as refresh rate. These competing interests must be reconciled to provide the desired user experience.

SUMMARY

Systems and methods are described that include two distinct animation systems. A high level animation system (e.g., an application) is primarily concerned with interactivity and complex timing structure and, therefore, is optimized for high interactivity. A low level animation system (e.g., a display device) is primarily concerned with a rendering refresh rate and is thus optimized for a high refresh frame rate. The provision of multiple distinct animation systems allows animation to run at a predefined display refresh rate without penalizing interactivity, or vice-versa.

The two animation systems run asynchronously so that each system can better focus on its primary function in its own timing structure. To optimize the user experience, the two animation systems must be synchronized. In the synchronization process described herein, the high-level animation system and the low-level animation system exchange data (e.g., clock data, animation function data, etc.) with the use of a communication protocol designed specifically for this purpose.

The communication protocol introduced herein provides an efficient way to exchange the required data. Instead of sending a large amount of data for each frame, the communication protocol provides for sending just a small amount of data about how the animation is supposed to change over a specified period of time. In addition to saving system overhead, the protocol ensures that the low-level animation system has information to process several frames of an animation, which results in no rendering frames being dropped due to a lack of refresh data.

BRIEF DESCRIPTION OF THE DRAWINGS

A more complete understanding of exemplary methods and arrangements of the present invention may be had by reference to the following detailed description when taken in conjunction with the accompanying drawings wherein:

FIG. 4a is a depiction of communication protocol messages and parameters transmitted from a high level timing engine to a low level timing engine to synchronize the high level animation system with the low level animation system.

FIG. 4b is a depiction of communication protocol messages and parameters transmitted from a low level timing engine to a high level timing engine to synchronize a high level animation system with a low level animation system.

FIG. 4c is a depiction of communication protocol messages and parameters transmitted from high level animation objects to low level animation objects to synchronize a high level animation system with a low level animation system.

DETAILED DESCRIPTION

Figure 1:
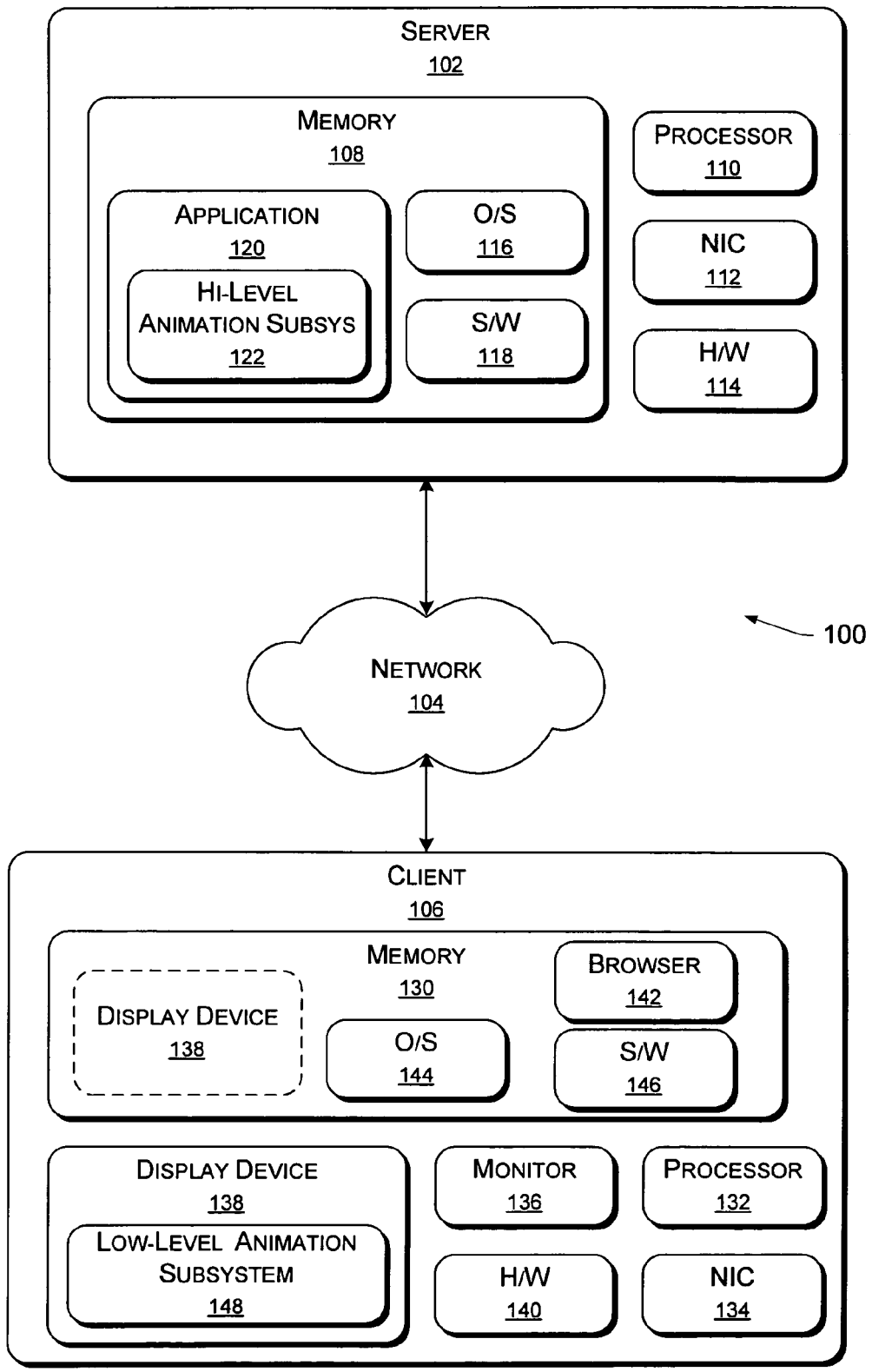
FIG. 1 is a block diagram of a server-client system including animation subsystems.

The following discussion deals generally with a computer system generating and rendering an animation (i.e. a function that modifies graphical objects over time) using a communication protocol that governs transmissions utilized in the generating and rendering. The graphical objects may comprise a window, a dialog box or the like. As used herein, the term "computer system" can mean either a single computer or multiple computers working together. The computer system includes multiple distinct animation/rendering systems—or subsystems—that each focuses on a particular animation or rendering function.

In the discussion below, a communication protocol is described in the context of two animation systems or subsystems. It is noted, however, that these are only examples and that the communication protocol may be used with more than two distinct animation systems or subsystems.

The term "rendering" is used in the discussion of the communication protocol introduced herein. "Rendering" may be viewed as a step in an animation process that defines the animation for display and/or displays the animation. A "rendering system" can be a system that includes a rendering function. This may be narrowly defined to describe a system that only performs a rendering function, or it may be broadly defined to describe a system that performs other functions in addition to one or more rendering functions, such as an animation system.

Similarly, the term "animation system" as used herein refers to a system that includes an animation function. An "animation system" may be a system that only performs animation functions, or it may be a system that performs one or more animation functions in addition to other functions, such as a rendering function.

The use of either particular term—"rendering system" or "animation system"—is not meant to limit the scope of the architecture and/or function associated therewith. The proper scope of the term used may be derived from the context in which the term is used.

A full-featured animation system includes complex timing structures, wherein each animation can be driven by a separate clock, and the clocks are related by an arbitrary set of rules specified by an application developer. For example, one animation (A) can be specified to begin exactly at the same time that a different animation (B) ends, or a group of animations can be specified to run at half their normal speed. In a more general sense, such a system can also handle synchronization of animations with other types of linear media, such as audio and video, by associating a clock with each piece of linear media.

In addition, the clocks are interactive, in that they can be started, paused or stopped at any time, and those interactions may cause changes that propagate through the entire timing hierarchy as dictated by the synchronization rules. Following the previous example, if animation (B) is paused and resumed five seconds later, then animation (A) will begin five seconds later than originally planned. This, in turn, may cause timing changes in other clocks, potentially propagating through the entire timing structure.

Calculating the changes to the timing structure is an expensive unbounded operation, so this operation is not suitable for a real-time rendering system that has a goal of meeting a predictable frame rate. These two goals (providing a full-featured animation system and maintaining a predictable frame rate) are contradictory. One solution is to divide the system into two parts: one which knows about synchronization rules between clocks and another that considers each clock as a fully independent entity.

The communication protocol claimed herein maintains the two distinct animation systems in synchronization so that animations can run at a high display refresh rate without penalizing interactivity and vice-versa.

An animation system described herein includes at least two components, namely, a high-level animation subsystem that is primarily concerned with interactivity and complex timing structures, and a low-level animation subsystem 11 that is primarily concerned with rendering one or more animations on a display at a high, constant display refresh rate. The term "high-level" refers to the fact that this animation system is closer to the user, while the "low-level" animation system is closer to the metal (or machine).

One example of a high-level animation subsystem is an application that controls animations according to data received from the application itself or from a user. An example of a low-level animation subsystem is a display device system that controls converting animation data to physically displayed animations. The display device system includes hardware components as well as software components that may be included on video card hardware (not explicitly shown) or in a component that does not physically reside on the video card.

In the present discussion, reference may be made to a display device as being a display system or an animation system or subsystem. However, it is noted that all the components and processing of a display system are not necessarily physically resident on the display device. The term "display device" as used herein also encompasses processor operations that control a display and any kind of display memory.

Normally, an animation process is thought of as being run in process on a single machine that includes both the high-level animation subsystem and the low-level animation subsystem (using a single animation system). However, the communication protocol described herein for two distinct animation systems anticipates the high-level and low-level animation subsystems running: (1) as two threads in a single process, (2) as two distinct processes on a single machine; or (3) on two distinct machines separated by a network, such as in a client-server architecture.

Exemplary Server-Client System

FIG. 1 is block diagram of an exemplary server-client system 100 in accordance with the systems and methods described herein. The server-client system 100 includes a server 102 and a client 104 that communicate over a network 106, such as the Internet.

The server 102 includes memory 108, a processor 110, a network interface card 112 for controlling communications over the network 106, and other miscellaneous hardware 114 typically required for a server to perform standard server functions. The memory 110 includes an operating system 116 and miscellaneous software components 118 that provide server functionality.

An application 120 is also stored in the memory 108 and includes a high-level animation subsystem 122 that incorporates computer code that controls one or more animation functions. The animation function could be a window, a dialog box, or the like. The high-level animation subsystem 122 is primarily focused on interactivity and complex timing structures. As will be seen in further discussion, the application 120 may include user-written computer code and system computer code that is isolated from user code that the user code accesses via one or more application programming interfaces (API).

The client 104 includes memory 130, a processor 132, a network interface card 134 that controls communications to and from the network 106, and a display 136. The client 104 also includes a display device 138 as well as miscellaneous hardware 140 that may be required for the client 104 to function appropriately.

The memory 130 stores a browser 142 configured to provide access to and navigate the network 106 and an operating system 144 that controls the basic functionality of the client 104. Miscellaneous software components 146 are also stored in the memory 130 and include software that provides necessary client 104 functionality and client services.

The display device 138 includes a low-level animation subsystem 148 that may be stored in display device memory (not shown), in a display device hardware component (not shown) or in the memory 130 included in the client 104. FIG. 1 shows that at least a portion of the display device 138 components may reside in the main memory 130 of the client 104. The low-level animation subsystem 148 is primarily focused on meeting rendering targets for a high refresh frame rate (a minimum refresh rate of thirty (30) frames per second). Sustaining the high refresh frame rate provides an excellent result and is pleasing to a viewer, which is the ultimate goal of an animation system.

Two obstacles that stand in the way of sustaining a high refresh frame rate for an animation are (1) latency, and (2) bandwidth. When sending data over a network, the data can be destined for anywhere in the world, which can create significant latencies. A latency problem prevents appropriate messages and feedback from arriving on time and this can cause the refresh rate to suffer and degrade the user experience. This is a greater problem with animation systems configured as single entity, since a great amount of data has to be sent regularly to control the animation.

The bandwidth issue also presents a greater problem for single entity systems. With a complex animation, huge amounts of data must be sent across the particular boundary (thread, process, network) for every frame. Even with the system described herein that includes two distinct animation subsystems, using bandwidth can be a problem with the use of a modem that inherently limits bandwidth or with a server that is serving an enormous number of clients. Even if a server must only transmit a relatively small amount of data for a simple animation, if that data must be served to, say, four hundred clients, it can become a bandwidth issue.

The systems and methods described herein provide an efficient way to minimize bandwidth utilization while maintaining a high refresh rate.

Exemplary Animation Rendering System Architecture

Figure 2:
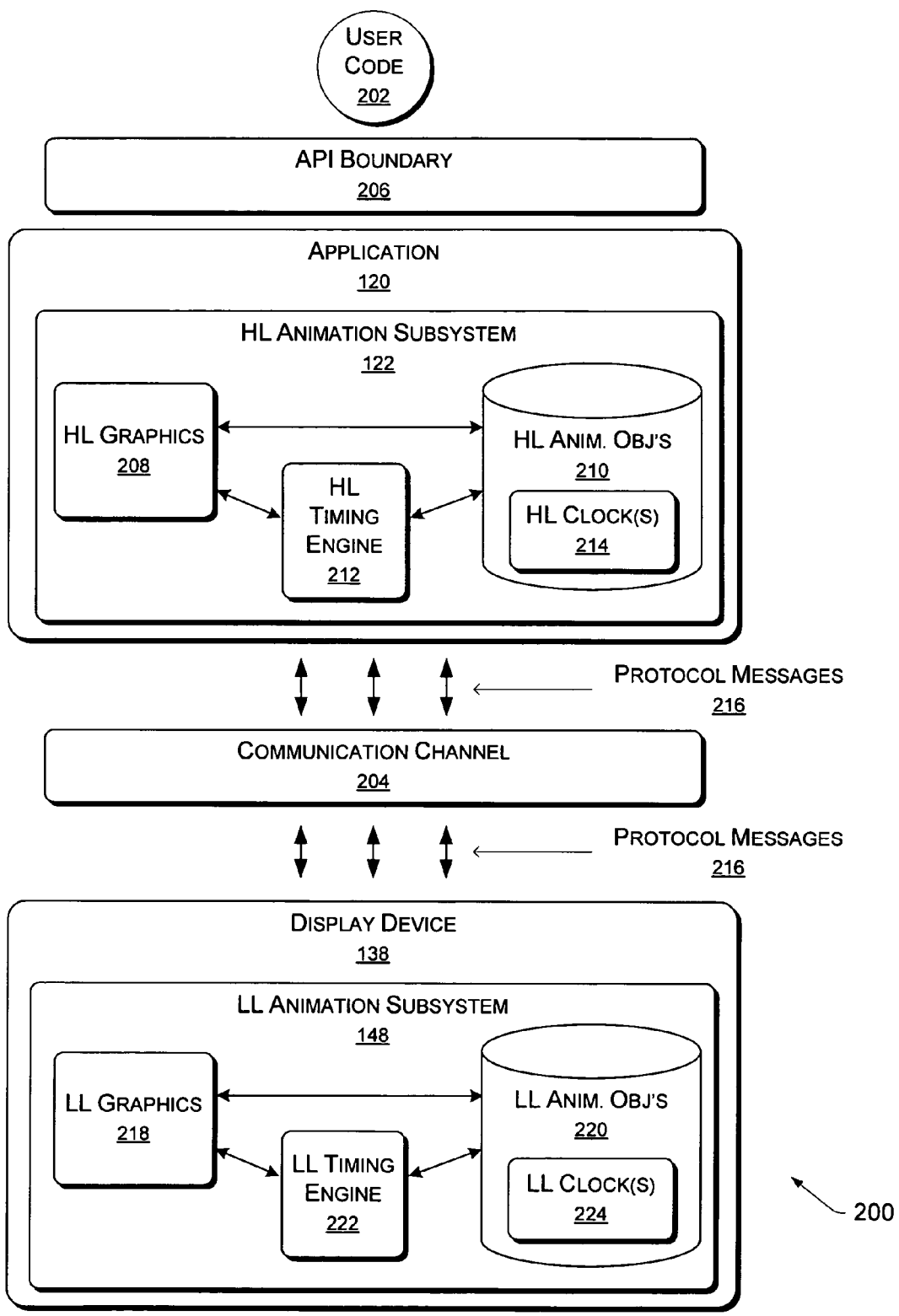
FIG. 2 is a block diagram of an exemplary animation rendering system architecture.

FIG. 2 is a block diagram of an exemplary animation rendering system architecture 200 in accordance with the systems and methods described herein. Some of the elements shown in FIG. 2 are elements that are also included in FIG. 1. For reference purposes, an element included in both figures is shown in FIG. 2 with the same reference numeral used for the element in FIG. 1.

The exemplary architecture 200 includes the application 120 and the display device 138. The application 120 communicates with the display device 138 via communication channel 204 according to a communications protocol 216 that will be discussed in greater detail below. As previously discussed, the communication channel 204 traverses a boundary that may be a boundary between threads, processes or machines. For a boundary between machines, for example, the communication channel 204 may be the network 106 previously shown.

User code 202 functions together with the application 120 via an API boundary 206 that is a set of system APIs that provide access to the application 120 by a developer that wants to utilize application 128 features with the user code 202.

As previously discussed, the application 120 encompasses the high-level animation subsystem 122. The high-level animation subsystem 122 includes a high-level graphics component 208, a high-level animation objects database 210 and a high-level timing engine 212. The timing engine 212 creates and controls one or more high-level clocks 214 stored in the high-level animation object database 210.

The high-level timing engine 212 is responsible for setting up and synchronizing the high-level clocks 214. So, for example, if there are ten (10) animations that are supposed to run together, the high-level timing engine 212 synchronizes ten (10) high-level clocks 214 to display the animations in synchronicity.

The high-level graphics component 208 stores the type of graphic used in an animation. The high-level animation objects database 210 stores animation values associated with one or more animations (and/or media objects associated with one or more media). The animation values include at least a timeline (i.e., a clock) associated with the animation. (It is noted that the terms "clock" and "timeline" as used herein are interchangeable). The animation values affect the output of animation rendering based on values of the high-level clocks 214. Each animation modifies one or more aspects of the high-level graphics component 208.

For example, for a simple animation of creating a line from point P1 to point P2, the animation objects database 210 would store a value for P1 at time=0 and a value for P2 at time=1. (All points between P1 and P2 are interpolated).

The display device 138 of the exemplary animation rendering system architecture 200 includes the low-level animation subsystem 148 shown in FIG. 1. The low-level animation subsystem 148 is an equivalent structure to the high-level animation subsystem 122 and includes a low-level graphics component 218, a low-level animation objects database 220 and a low-level timing engine 222. The timing engine 222 creates one or more low-level clocks 224 that are stored in the low-level animation objects database.

The components (218–224) of the low-level animation subsystem 148 are similar to the components (208–214) of the high-level animation subsystem 122 and their functions and inter-operability are similar as previously described.

There are advantages of an architecture like the exemplary animation rendering system architecture 200, i.e. an architecture that has an animation system factorized into two subsystems. If an application is expensive and spends a lot of overhead with interactivity, the animation can continue; it doesn't have to wait for the interactive portion to complete before the animation can continue. In a non-factorized system, if the application doesn't provide the display with regular data updates, then the display may draw static images rather than a moving animation."

A common example of the problem is characterized by a status ribbon indicator that is displayed while a system is processing information. Usually, the indicator progresses, for instance, in a left-to-right direction that indicates that some processing is going on. However, there are times when the status indicator stops and the user cannot tell if the system has locked up or is still processing something. This is a result of the interactive portion of the animator not providing updated data to the display portion in time to meet the frame rate refresh.

Such a system is particularly poor for videos. With a video, a frame can be dropped—resulting in a glitch, or artifact—simply because the system was busy taking care of another task (that could be as minor as moving a mouse cursor).

In a factorized animation system, the low-level animation subsystem 148 runs asynchronously from the high-level animation subsystem 122, so it continues to run (i.e., draw) even when the high-level animation subsystem 122 gets tied up with a task that prevents it from re-drawing a frame before the frame is refreshed. The factorized animation system, therefore, seamlessly displays an animation operation and, therefore, provides a superior user experience.

Exemplary Methodological Implementation: Basic Operation

Figure 3:
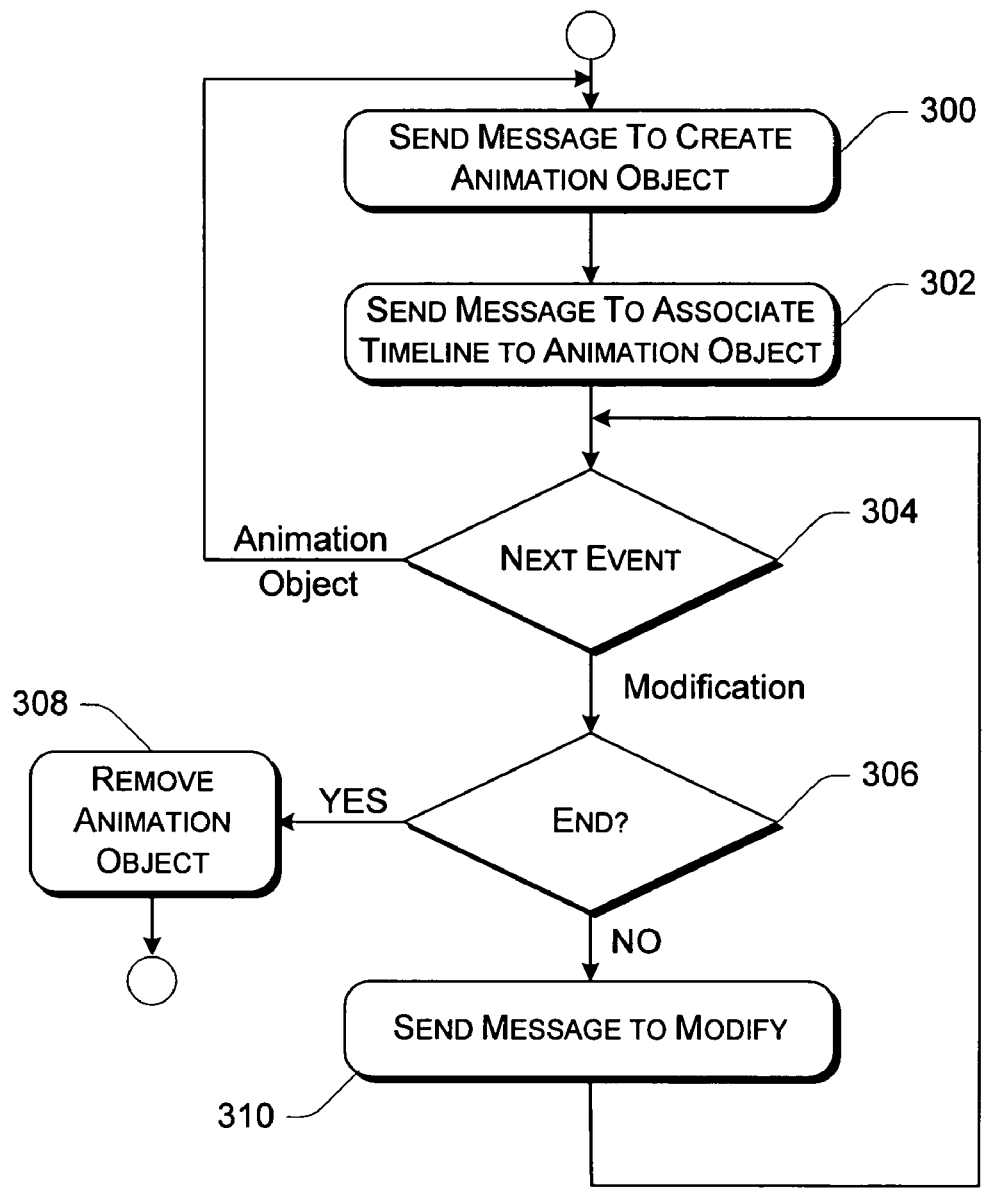
FIG. 3 is a flow diagram depicting a methodological implementation of a basic operation of a factorized animation/rendering system.

FIG. 3 is a flow diagram that depicts basic operation of a factorized animation/rendering system, such as shown in FIG. 1 and FIG. 2. In the following discussion, continuing reference will be made to elements and reference numerals shown in FIGS. 1 and 2.

In a factorized animation system (i.e., an animation system that is factored into at least two distinct animation subsystems that function asynchronously with each other), a user (application) tells a high-level system, through system APIs, how graphics are supposed to appear on a display. The high-level system uses a specialized communication protocol to direct a low-level system to create a structure similar to one set up in the high-level system.

Since the high-level system is configured to create several elements in the low-level system, it necessarily follows that the communication protocol—discussed in greater detail, below, with respect to FIG. 4—includes several "create" messages or commands. The flow diagram shown in FIG. 3 covers some basic steps that occur when the high-level animation subsystem 122 communicates with the low-level animation subsystem 148 to set up structure therein.

At block 300, the high-level animation subsystem 122 sends a message to create an animation object 220 in the low-level animation subsystem 148. The high-level animation subsystem 122 then communicates with the low-level animation subsystem 148 to create a clock 224 (i.e., a timeline) to include with the animation object 220 that was just created (block 302).

It is noted that there is not necessarily a 1:1 ratio between animation objects and timelines. In other words, one timeline may control more than one animation object. Therefore, in the step described above for block 302, the timeline may not need to be created if one already exists and if the newly-created animation object can be associated with the existing timeline.

At this point, the application 120 may create another animation object or modify an existing animation. If the application 120 is configured to create another animation object ("animation object" branch, block 304), then the high-level animation subsystem 122 sends a communication protocol message to the low-level animation subsystem 138 to create another animation object 220 at block 300. The high-level animation subsystem 122 then sends a message at block 302 to associate a timeline with the newly-created animation object 220. The timeline may be created or it may be an existing timeline.

The application 120 is also configured to support modifications. The high-level animation subsystem 122 can send a message to modify an animation object 220 and/or a timeline associated therewith ("modification" branch, block 304). In addition to a straightforward modification that modifies an aspect of an animation, a "pause" operation and a "stop" operation are also modifications. A "pause" operation can be coded in terms of a typical modification, e.g., "at time 0, clock is 10; and at time 10, clock is 10." A "stop" operation is initiated with a "remove animation" message.

If the modification is a "remove animation" message ("Yes" branch, block 306, then the animation is halted at block 308. Otherwise ("No" branch, block 306), the high-level animation system 122 sends one or more messages configured to modify an existing animation (block 310). Modifying an existing animation may also mean modifying the timeline associated with an existing animation.

As previously mentioned, the above flow diagram depicts a general methodology for configuring a low-level animation subsystem 148 by sending communication protocol messages from a high-level animation subsystem 122. At least one more specific methodological implementation utilizing the communication protocol will be discussed in greater detail below, after the specifics of the communication protocol are discussed.

Communication Protocol

FIGS. 4a, 4b and 4c are tables outlining messages/commands of a communication protocol for use in governing transmissions between a high-level animation system and a low-level animation system. In the following discussion, continuing reference will be made to the elements and reference numerals shown and described in FIG. 1 and FIG. 2.

FIG. 4a depicts a table 400 that describes messages sent from the high-level timing engine 212 to the low-level timing engine 222. A "Create Clock" message 402 causes the low-level timing engine 222 to create a clock for an animation. The "Create Clock" message 402 includes "Create Clock Parameters" 404, which are the initial clock properties. Clock properties may include, but are not limited to, duration (from a begin time), parent clock (to which all times in this clock are relative), speed (relative to its parent), acceleration and deceleration. The acceleration and deceleration parameters specify the percentage of the "duration" time that is spent "speeding up" or "slowing down" the animation.

An "Update Properties" message 406 provides an update to an existing clock's properties. "Update Properties Parameters" 408 include the target clock (i.e. the clock having the properties to be updated), and the updated properties and values. An "Add Interval" message 410 instructs the low-level timing engine to add an interval to an existing animation (object) and includes "Add Interval Parameters" 412 that identify a target clock and properties of the interval that is being added to the target clock.

The protocol includes a "Reset Synchronization Slip" message 414 and an associated "Reset Synchronization Slip Parameter" 416 that are used to maintain synchronization between the high-level animation subsystem 122 and the low-level animation subsystem 148. How this is implemented is a matter of a particular system design.

In at least one implementation, the synchronization process is described by the following example. If the low-level animation subsystem 148 is controlling a video file and it detects that the video is falling behind (due to, for example, network traffic), then the low-level animation subsystem 148 sends a "Synchronize With Media Slip" message and parameter(s) (see FIG. 4b, below) to the high-level animation subsystem 122 and stores the fact that a slip has occurred and the magnitude of the slip.

When the high-level animation subsystem 122 (specifically, the high-level timing engine 212) finishes updating the intervals to take the slip into account, it sends the "Reset Synchronization Slip" message 414 and an associated "Reset Synchronization Slip Parameter" 416 to tell the low-level animation subsystem 148 to reset the slip offset to zero.

For further information on this particular protocol message, please refer to FIG. 4b, below.

A "Remove All Intervals" message 418 may be sent to the low-level timing engine 222 to remove any existing intervals associated with a particular clock. The target clock is identified in a "Remove All Intervals Parameter" 420. A "Delete Clock" message 422 is also included in the communication protocol and is sent to the low-level timing engine 222 to remove a target clock—identified in a "Delete Clock Parameter" 424.

FIG. 4b depicts a table 430 that describes a message in the communication protocol that is sent from the low-level timing engine 222 to the high-level timing engine 212. A "Synchronize With Media Slip" message 432 provides the high-level timing engine 212 with an amount that the high-level timing engine 212 should slip a particular clock to sync-up with a media component. * NOTE: Is this even close to correct?* "Synchronize With Media Slip Parameters" 434 include a target clock that is the clock to slip, and a slip amount that identifies the magnitude of the slip.

The message sends data back to the high-level animation subsystem 122 from the low-level animation subsystem. This is necessary due to the existence of a latency in the communication channel 204. One instance in which this may happen is when a user activates a "pause" command. Since the systems communicate with each other asynchronously, the low-level animation subsystem may process a number of frames before the high-level animation subsystem can catch up to the low-level animation subsystem. As a result, the low-level system runs long.

But this is taken care of with the "Synchronize With Media Slip" message 432 that gets information to the high-level animation subsystem 122 that the clock associated with the animation needs to "slip" or "synch up" with the low-level clock 224 to get the subsystems back in synchronization.

FIG. 4*c* depicts a table 440 that describes messages sent from the high-level animation objects 210 to the low-level animation objects 220. The table 440 includes a "Create Animation" message 442 that commands the low-level animation subsystem 148 to create a new animation object. "Create Animation Parameters" 444 include an output value type that identifies the type of the property being animated, an animation function, an animation function and a controlling clock.

For example, if the angle of a rotation transform is animated, then the output type is "double-precision floating point number." If one of the end points of a line is animated, then the output type is "point." If the color of a rectangle is animated, then the output type is "color."

Animation functions are known in the art and any such animation function may be designated here. An example of a simple animation function is "from 5 to 10." This means that at the beginning of the interval, the animation function outputs a value of 5, at the end it outputs a 10, and at halfway through the animation function outputs a value of 7.5, etc. A more complex animation function is "from 5 to 6 to 10." Here, the output value halfway through the animation is 6. The function can be made more complex by specifying not only a list of values, but a list of times at which the function should output those values (with everything in between being interpolated).

It is noted that the animation functions described above are exemplary only and are not intended to limit the scope of the appended claims to these animation functions. Any computer operation that can be considered to be an "animation function" may be used in this context.

Finally, as previously discussed, the controlling clock for a new animation object may be a new clock or it may be an existing clock that may or may not be controlling one or more other animation objects.

The table 440 also includes an "Update Animation" message 446 that provides information to update an existing animation in the low-level animation subsystem 148. "Update Animation Parameters" 448 include a target animation (i.e. the animation to be updated), and updated properties (properties to be updated and updated values for the properties).

A "Create Animation Collection" message 450 identifies multiple animations in the low-level animation objects [database] 220 that are to be grouped as a collection. A "Create Animation Collection Parameter" 452 identifies an initial list of animations that are to be grouped as a collection.

Animation collections are also well known in the art. Animation collections exist to allow a developer to create complex animation behaviors that cannot be expressed with a single linear interpolation. For example, one animation can move a point up and down repeatedly, while a second animation can move a point to the right. When both animations are run together, the point appears to follow a wave pattern to the right. Animation collections can be edited, hence the existence of the messages in the protocol described below.

An "Add Animation To Collection" message 454 tells the low-level system to add an animation identified in an "Add Animation To Collection Parameter" 456 to an animation collection that is also identified in the "Add Animation To Collection Parameter" 456. Similarly, a "Remove Animation From Collection" message 458 is included with a "Remove Animation From Collection Parameter" 460 that identifies a target animation collection and an animation in the collection that is to be removed from the collection.

The table 440 also includes a "Create Static Value" message 462. A static value is used in the case where the low-level animation subsystem 148 cannot support an animation provided by the application 120. This situation is described in greater detail, below, with respect to FIG. 6. Associated with the "Create Static Value" message 462 is a "Create Static Value Parameter" 464 that identifies a value type and an initial value for the static value that is created.

An "Update Static Value" message 466 provides an update to a static value. An "Update Static Value Parameter" 468 identifies a target static value object and a new value for the static value object so identified.

The messages and parameters shown in FIG. 4(*a–c*) provide a streamlined, efficient way in which animations rendered by a low-level animation subsystem 148 can be asynchronously controlled by a high-level animation subsystem. Since one or more messages do not have to be sent in every rendering refresh frame, the display can render frames at a high, constant rate. At the same time, the high-level system can use processing time as it becomes available to provide data to the low-level system, i.e. at a slower and varied refresh rate.

Exemplary Methodological Implementation: Fully Connected System

Figure 5:
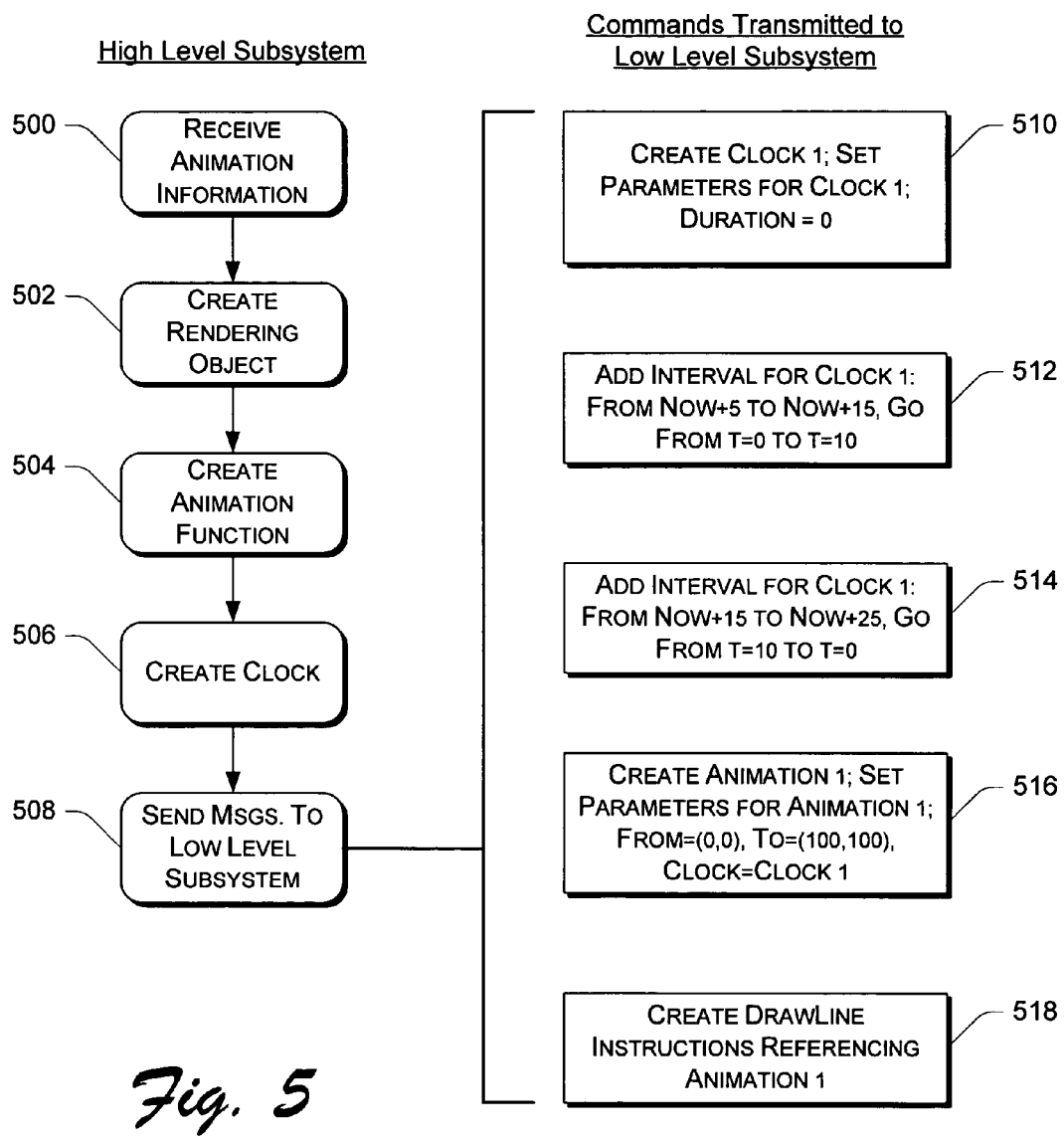
FIG. 5 is a flow diagram depicting an exemplary methodological implementation of an animation process in a rendering system having a fully connected high level animation system and low level animation system.

FIG. 5 is a flow diagram depicting an exemplary methodological implementation of an animation process in a rendering system having a fully connected high level animation system and low level animation system.

The scenario depicted in FIG. 5 is: An application developer wants to draw an animated straight line going from a fixed anchor point to a second point that moves over time. The developer needs to provide three things: (1) the rendering operation (e.g. draw a line between static point A and animate point B); (2) the animation function (e.g. point B goes from (0,0) to (100, 100); and (3) the timing of the animation (e.g. start in five seconds and run for ten seconds, then repeat once going backwards).

FIG. 5 shows the response of the high-level animation subsystem 122 to the application 120 containing the information discussed above. At block 500, the high-level animation subsystem 122 receives the information from the application 120. The high-level animation subsystem 122 creates a rendering object at block 502, the rendering object representing a line. At block 504, the high-level animation subsystem 122 creates an animation function that outputs a value from (0,0) to (100,100). At block 506, the high-level animation subsystem 122 creates a clock that starts in five seconds, runs for ten second and then runs backwards.

The low-level animation subsystem 148 can support these objects, so the high-level animation subsystem 120 sends messages to the low-level animation subsystem 148 (block 508) that generates traffic on the communication channel 204 that is depicted in blocks 510–518.

Block 510: Create Clock 1; Set parameters for clock 1, duration=10.

Block 512: Add Interval for Clock 1; From "now+5" to "now+15", go from t=0 to t=10.

Block 514: Add Interval for Clock 1; From "now+15" to "now+25", go from t=10 down to t=1.

Block 516: Create Animation 1; Set parameters for animation 1, from (0,0) to (100,100), clock=clock 1.

Block 518: Create [DrawLine] instruction referencing animation 1.

In this example, the DrawLine function is representative of any drawing instruction supported by a protocol for rendering animations. The DrawLine instruction is exemplary only.

After the messages have been transmitted from the high-level animation subsystem 122 to the low-level animation subsystem 148, the low-level animation subsystem 148 runs independently of the high-level subsystem 148, and updates the position of the line at the highest possible frame rate. No further messages need to be sent between the two subsystems 122, 148.

As has been shown, the communication protocol introduced herein optimizes the communication channel 204 by simplifying the amount of data that is put into the communication channel 204. If the short messages and parameters discussed above were not used, a large number of operations would have to be sent through the pipeline to synchronize the systems.

But, in essence, what is put into the communication channel 204 is a list of intervals for a number of clocks. For a clock an interval is defined, say, as 'between time 0 and time 10, the clock goes from 0 to 10' (this defines a real-world clock). Or, maybe the clock is desired to run twice as slow. In this case, then 'between time 0 and time 10, the clock goes from 0 to 5'.

By defining a list of timing intervals, every operation on a clock can be defined. For example, a pause operation can be defined with a clock interval: 'at time 0, the clock is 10 and at time 10, the clock is 10'. Therefore, every operation can be expressed as a linear interval.

Exemplary Methodological Implementation: Partly Connected System

Figure 6:
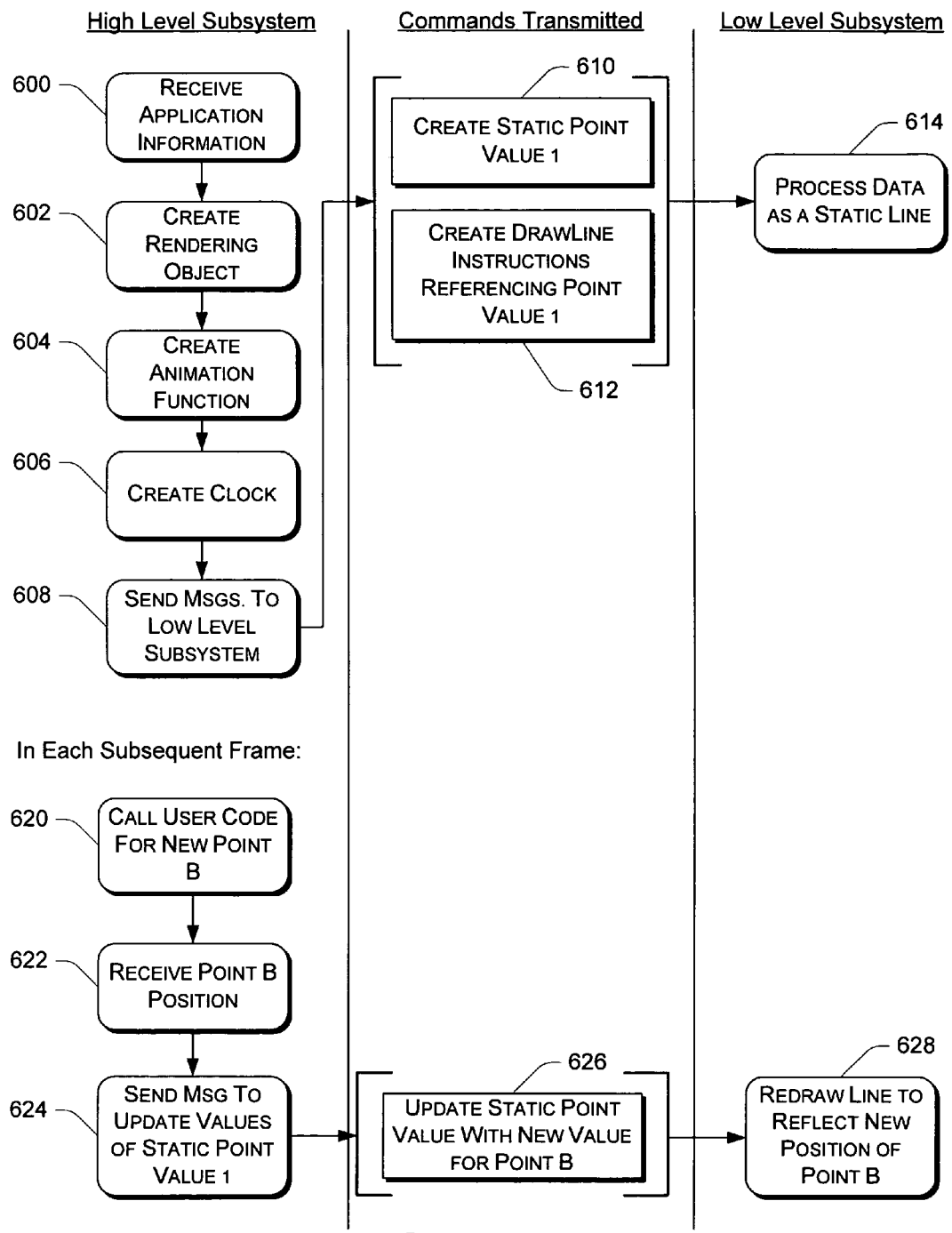
FIG. 6 is a flow diagram depicting an exemplary methodological implementation of an animation process in a rendering system having a partially connected high level animation system and low level animation system.

FIG. 6 is a flow diagram depicting an exemplary methodological implementation of an animation process in a rendering system having a partially connected high level animation system and low level animation system.

The scenario for this example is: An application developer wants to draw an animated straight line going from a fixed anchor point to a second point that moves over time on a custom path. The developer needs to provide the following:

(1) the rendering operation (e.g. draw a line between static point A and animate point B); (2) the custom animation function (e.g. call custom animation 1 to compute the position of point B); and (3) the timing of the animation (e.g. start in five seconds and run for ten seconds, then repeat once going backwards).

The high-level animation subsystem 122 receives the application information at block 600. In response to the application's request, the high-level animation subsystem 122 creates a rendering object (block 602) representing the line, an animation function (block 604) that is configured to call back user code 202, and a clock (block 606) that starts in five seconds, runs for ten seconds and then runs backwards. The appropriate messages are sent to the low-level animation subsystem 148 at block 608.

Since the custom animation requires user code, it can't be processed by the low-level subsystem, so this generates the following initial traffic on the communication channel:

Block 610: Create Static Point Value 1.

Block 612: Create [DrawLine] Instructions Referencing Point Value 1. (DrawLine instruction is exemplary only; see above).

At block 614, the low-level animation subsystem 148 receives the transmitted data from the high-level animation subsystem 122. The low-level 11 animation subsystem 148 treats the animation as a static line.

On every frame after the initial transmission of data, the high-level animation subsystem 122 calls the user code 202 to compute the position of point B (block 620) and receives the new position value at block 622. The high-level animation subsystem 122 then sends the following message over the communication channel 204 to the low-level animation subsystem to update the value of the static point value 1:

Block 626: Update Static Point Value with New Value for Point B.

Exemplary Computer Environment

Figure 7:
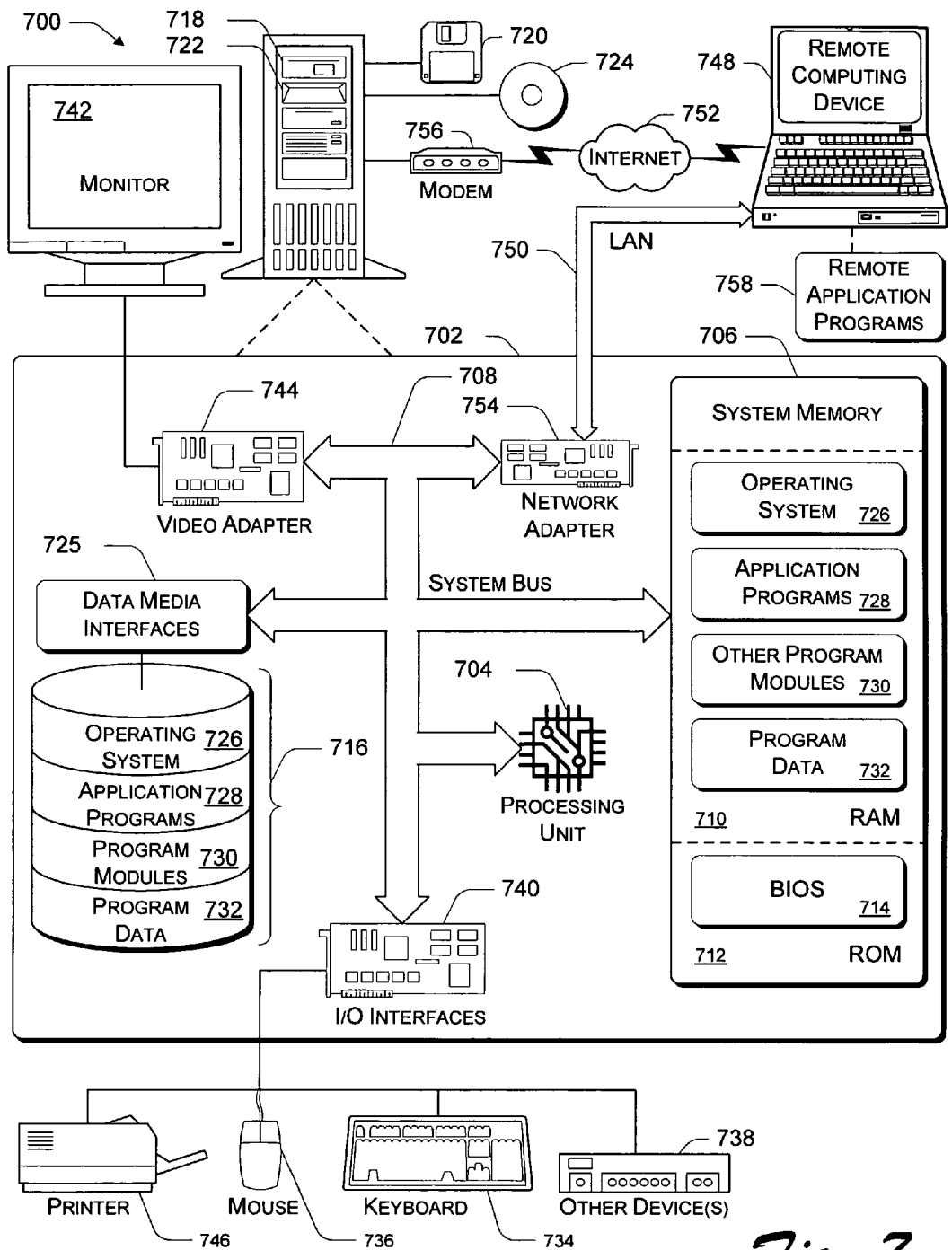
FIG. 7 is an exemplary computing environment in accordance with the systems and methods described herein.

The various components and functionality described herein are implemented with a computing system. FIG. 7 shows components of typical example of such a computing system, i.e. a computer, referred by to reference numeral 700. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 700 may include, but are not limited to, a processing unit 702, a system memory 704, and a system bus 706 that couples various system components including the system memory to the processing unit 702. The system bus 706 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 700 typically includes a variety of computer-readable media. Computer-readable media can be any available media that can be accessed by computer 700 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 700. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 704 includes computer storage media in the form of volatile and/or nonvolatile memory such as read only memory (ROM) 708 and random access memory (RAM) 710. A basic input/output system 712 (BIOS), containing the basic routines that help to transfer information between elements within computer 700, such as during start-up, is typically stored in ROM 708. RAM 710 typically contains data and/or program modules that are immediately accessible to and/or presently being operated on by processing unit 702. By way of example, and not limitation, FIG. 7 illustrates operating system 714, application programs 716, other program modules 718, and program data 720.

The computer 700 may also include other removable/non-removable, volatile/nonvolatile computer storage media. By way of example only, FIG. 7 illustrates a hard disk drive 722 that reads from or writes to non-removable, nonvolatile magnetic media, a magnetic disk drive 724 that reads from or writes to a removable, nonvolatile magnetic disk 726, and an optical disk drive 728 that reads from or writes to a removable, nonvolatile optical disk 730 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 722 is typically connected to the system bus 706 through a non-removable memory interface such as data media interface 732, and magnetic disk drive 724 and optical disk drive 728 are typically connected to the system bus 706 by a removable memory interface such as interface 734.

The drives and their associated computer storage media discussed above and illustrated in FIG. 7 provide storage of computer-readable instructions, data structures, program modules, and other data for computer 700. In FIG. 7, for example, hard disk drive 722 is illustrated as storing operating system 715, application programs 717, other program modules 719, and program data 721. Note that these components can either be the same as or different from operating system 714, application programs 716, other program modules 718, and program data 720. Operating system 715, application programs 717, other program modules 719, and program data 721 are given different numbers here to illustrate that, at a minimum, they are different copies. A user may enter commands and information into the computer 700 through input devices such as a keyboard 736 and pointing device 738, commonly referred to as a mouse, trackball, or touch pad. Other input devices (not shown) may include a microphone, joystick, game pad, satellite dish, scanner, or the like. These and other input devices are often connected to the processing unit 702 through an input/output (I/O) interface 740 that is coupled to the system bus, but may be connected by other interface and bus structures, such as a parallel port, game port, or a universal serial bus (USB). A monitor 742 or other type of display device is also connected to the system bus 706 via an interface, such as a video adapter 744. In addition to the monitor 742, computers may also include other peripheral output devices 746 (e.g., speakers) and one or more printers 748, which may be connected through the I/O interface 740.

The computer may operate in a networked environment using logical connections to one or more remote computers, such as a remote computing device 750. The remote computing device 750 may be a personal computer, a server, a router, a network PC, a peer device or other common network node, and typically includes many or all of the elements described above relative to computer 700. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 700 is connected to the LAN 752 through a network interface or adapter 756. When used in a WAN networking environment, the computer 700 typically includes a modem 758 or other means for establishing communications over the Internet 754. The modem 758, which may be internal or external, may be connected to the system bus 706 via the I/O interface 740, or other appropriate mechanism. In a networked environment, program modules depicted relative to the computer 700, or portions thereof, may be stored in the remote computing device 750. By way of example, and not limitation, FIG. 7 illustrates remote application programs 760 as residing on remote computing device 750. It will be appreciated that the network connections shown are exemplary and other means of establishing a communications link between the computers may be used.

CONCLUSION

The communication protocol for the systems and methods as described thus provide a way to synchronize a high-level animation system with a low-level animation system so that the low-level system can run at a fast, constant frame refresh rate, while the high-level system can run at a variable frame rate that is optimized for interactivity. Superior graphics can be achieved without sacrificing any interaction capability. The protocol also minimizes the amount of data transmitted between the two animation systems, thus saving overhead and optimizing performance.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. An animation rendering system, comprising:
a high-level animation subsystem that handles interaction functions for the system;
a low-level animation subsystem that handles display functions for the system;
at least one high-level clock that is referenced by high-level animation operations;
at least one low-level clock that is referenced by low-level animation operations;
a communications channel for sending messages between the high-level animation subsystem and the low-level animation subsystem according to a communications protocol;
wherein the communication protocol further comprises at least one message sent from the low-level animation subsystem to the high-level animation subsystem to handle synchronization between the high-level animation subsystem and the low-level animation subsystem, the one message comprising a "synchronize with media slip" message tat identifies a target clock associated with an animation and an amount that the target clock must slip to synchronize the high-level animation subsystem with the animation being run by the low-level animation subsystem; and
wherein the communications protocol includes information provided to the low-level animation subsystem by the high-level animation subsystem that designates an animation and specifies how the animation is to change over a specified period of time, thereby ensuring that the low-level animation system has information to process several frames of the animation.

2. The animation rendering system as recited in claim 1, wherein the communications between the high-level animation subsystem and the low-level animation subsystem are asynchronous.

3. The animation rendering system as recited in claim 1, wherein:
the low-level animation subsystem renders animations at a constant display frame refresh rate; and
the high-level animation subsystem handles interactions at a variable rate that is slower than the constant display frame refresh rate.

4. The animation rendering system as recited in claim 1, wherein:
the high-level animation subsystem farther comprises a high-level timing engine;
the low-level animation subsystem further comprises a low-level timing engine; and the communication protocol further comprises the following parameterized messages that are sent from the high-level timing engine to the low-level timing engine:
a create clock message with initial clock properties parameter;
an update properties message with a target clock parameter and an updated properties parameter;
an add interval message with a target clock parameter and an interval properties parameter;
a reset synchronization slip message with a target clock parameter;
a remove all intervals message with a target clock parameter; and
a delete clock message with a target clock to delete parameter.

5. The animation rendering system as recited in claim 1, wherein:
the high-level animation subsystem further comprises a high-level animation objects database;
the low-level animation subsystem further comprises a low-level animation objects database; and
the communication protocol further comprises the following parameterized messages that are sent from the high-level animation objects database to the low-level animation objects database:
a create animation message with an output value type parameter, an animation function parameter and a controlling clock parameter;
an update animation message with a target animation parameter and an updated properties parameter;
a create animation collection message with a list of animations parameter;
an add animation to collection message with a target animation collection parameter and an animation to add parameter;
a remove animation to collection message with a target animation collection parameter and an animation to remove parameter;
a create static value message with a value type parameter and an initial value parameter; and
an update static value parameter with a target static value object parameter and a new value parameter.

6. A method for processing an animation application, comprising:
receiving animation data from the animation application into a high-level animation subsystem;
transmitting animation information from the high-level animation subsystem to a low-level animation subsystem according to a communication protocol over a communications channel so that the low-level animation subsystem can display an animation associated with the animation data;
wherein the communication protocol provides for designating an animation and for instructions regarding how the animation should change over a particular time period so that the low-level animation subsystem can process several frames of the animation at a constant display frame refresh rate while the high-level animation subsystem executes at a variable refresh rate, and
wherein the communication protocol includes the following messages that are sent from a high-level animation subsystem timing element to a low-level animation subsystem timing element:
a message to create a clock;
a message to update clock properties;
a message to add an interval to a clock;

a message to remove all intervals for a clock; and
a message to delete a clock.

7. The method as recited in claim 6, wherein the communication protocol further includes the following messages that are sent from a high-level animation subsystem timing element to a low-level animation subsystem timing element:
a message to reset a synchronization slip value in the low-level animation subsystem.

8. The method as recited in claim 6, wherein the communication protocol includes the following messages that are sent from a high-level animation subsystem animation object element to a low-level animation subsystem animation object element:
a message to create an animation;
a message to update an animation;
a message to create an animation collection;
a message to add an animation to an animation collection; and
a message to remove an animation from an animation collection.

9. The method as recited in claim 6, wherein the communication protocol includes the following messages that arc sent from a high-level animation subsystem animation object element to a low-level animation subsystem animation object element:
a message to create a static display value; and
a message to update a static display value.

10. A system, comprising:
a high-level animation subsystem configured to receive animation information from an application;
a low-level animation subsystem configured to render one or more animations according to the animation information;
a low-level timing engine configured to monitor one or more low-level clocks in the low-level animation subsystem and to synchronize the low-level clocks with one or more high-level clocks;
a high-level timing engine configured to monitor one or more high-level clocks in the high-level animation subsystem according to one or more high-level animation objects and to transmit animation messages to the low-level timing engine, the animation messages conforming to a communication protocol;
wherein the low-level timing engine is configured to send a synchronization message to the high-level timing engine according to the communication protocol that identifies a high-level clock and measure of how much the high-level clock should be altered to synchronize the high-level clock with a low-level clock; and
wherein the animation messages that are transmitted from the high-level timing engine to the low-level timing engine designate one or more animation objects and how the animation objects are to change over a specified period of time.

11. The system as recited in claim 10, wherein the low-level timing engine synchronizes a low-level clock with a high-level clock by sending a "synchronize with media slip" message that identifies the high-level clock and an amount by which the high-level clock must slip to maintain synchronization with a low-level clock that corresponds to the high-level clock.

12. The system as recited in claim 10, wherein the communication protocol further comprises the following messages:
a create clock message that identifies clock properties;
an update properties message that identifies updated clock properties;
an add interval mess age that adds a timing interval to clock properties;
a remove intervals message that removes timing intervals from clock properties; and
a delete clock message that deletes a clock.

13. The system as recited in claim 10, wherein the communication protocol further comprises the following messages:
a create animation message that creates an animation;
an update animation message that updates an existing animation;
a create animation collection tat identifies multiple animations to be grouped;
an add animation to collection message that identifies an animation to add to an identified animation collection; and
a remove animation to collection message that identifies an animation to remove from an identified animation collection.

14. The system as recited in claim 10, wherein the communication protocol further comprises the following messages:
a create static value message tat identifies a value type and an initial value to display; and
an update static value message that identifies a static value to update and a new value for the static value.

15. The system as recited in claim 10, further comprising:
at least one low-level animation object;
at least one high-level animation object configured to communicate with the low-level animation objects through communication protocol messages to create and update the low-level animation objects to reflect the high-level animation objects.

16. A high-level animation subsystem in an animation rendering system, comprising:
one or more high-level clocks;
a high-level timing engine configured to track the one or more high-level clocks;
one or more animation objects that identify at least a portion of an animation;
means for transmitting animation data to a low-level animation subsystem according to messages included in a communication protocol; and
wherein the communication protocol messages transmitted to the low-level animation subsystem identifies at least one of the animation objects in the low-level animation subsystem and provides data regarding bow the identified animation objects are to change over a specified period of time, and
wherein the communication protocol further comprises the following messages:
a create animation message that describes an animation to create; and
an update animation message that identifies an animation to update and updated properties.

17. The high-level animation subsystem recited in claim 16, wherein the communication protocol further comprises the following messages;
a create clock message that identifies initial clock properties;
an update properties message that identifies updated clock properties;
an add interval message that identifies an interval to be added to a clock;

a remove all intervals message that identifies a clock from which all intervals are to be removed; and a delete clock message that identifies a clock to be deleted.

18. The high-level animation subsystem recited in claim 16, wherein the communication protocol further comprises the following messages:

a create animation collection message that identifies multiple animations that are to be grouped as one animation collection;

an add animation to collection message that identifies an animation to be added to an identified animation collection; and a remove animation from collection message that identifies an animation to be removed from an identified animation collection.

19. The high-level animation subsystem recited in claim 16, wherein the communication protocol further comprises the following messages:

a create static value message that identifies a value type and an initial value to render; and an update static value message that identifies a static value to update and a new value for the static value.

* * * * *